No. 878,693. PATENTED FEB. 11, 1908.
S. VESSOT.
GRAIN MILL.
APPLICATION FILED MAY 16, 1904.

Witnesses:
John T. Deuferwid
F. D. Ammen

Samuel Vessot, Inventor
By Marion & Marion
Attorneys

No. 878,693.

PATENTED FEB. 11, 1908.

S. VESSOT.
GRAIN MILL.
APPLICATION FILED MAY 16, 1904.

Witnesses:

Samuel Vessot, Inventor

By Marion & Marion

Attorneys

No. 878,693. PATENTED FEB. 11, 1908.
S. VESSOT.
GRAIN MILL.
APPLICATION FILED MAY 16, 1904.
6 SHEETS—SHEET 6.

Witnesses:
Eugene W. Hiney.
W. S. Babcock.

Inventor:
Samuel Vessot,
by Marion & Marion
Attorneys

UNITED STATES PATENT OFFICE.

SAMUEL VESSOT, OF JOLIETTE, QUEBEC, CANADA.

GRAIN-MILL.

No. 878,693.  Specification of Letters Patent.  Patented Feb. 11, 1908.

Application filed May 16, 1904. Serial No. 208,185.

*To all whom it may concern:*

Be it known that I, SAMUEL VESSOT, a subject of the King of Great Britain, residing at Joliette, county of Joliette, in the Province of Quebec, Canada, have invented certain new and useful Improvements in Grain-Mills; and I do hereby declare that the following is a full, clear, and exact description of the invention, such as will enable others skilled in the art to which it appertains to make and use the same.

My invention relates to grinding mills such as used for grinding grain.

It is especially applicable to those types of mills which comprise a hopper beneath which there is disposed a shaker or sieve, adapted to separate the sand and other foreign matter from the grain as it proceeds toward the grinding apparatus and grinding-plates.

The object of this invention is to provide certain new and useful improvements in such grinding mills, all as hereinafter more fully described and specifically pointed out in the claims.

In the accompanying drawings, forming part of this application, I have illustrated one form of embodiment of my invention, in which drawings similar reference characters designate corresponding parts, and in which.

Referring more particularly to the parts, 1 represents a base, preferably substantially rectangular in form, and having its ends formed into pillow-blocks 2, which support bearings or boxes 3. These boxes are preferably formed hollow, as shown, and contain a quantity of oil 4, as shown. Within these boxes, sleeves 5 and 6 are respectively supported, the same being freely supported by means of curved faces 7, and constituting supports for a shaft 8. The sleeves 5 and 6 are mutilated at 9, so as to receive oil rings 10, which dip in the oil 4, and rest upon the upper side of the shaft so as to operate to oil the shaft continuously as it rotates. Oil collars 11 are provided in the heads of the boxes 3, as shown.

Toward the outer side of the base, the forward box 3ª is attached to a plate 12, to the face of which there is attached a grinder-casing 13, through which projects the extremity of the aforesaid shaft 8.

The casing 13 is provided with a removable cover 14, having a centrally disposed opening 15 of enlarged diameter, in which opening there is received a feed-screw 16, the same being carried upon the extremity of the aforesaid shaft 8. The extremity of the shaft 8 is formed with reduced necks 17 and 18, which are threaded as shown, in opposite directions, this arrangement being adopted for the purpose of enabling either right or left hand feed-screws to be used with the grinder, it being understood that a feed-screw would be used corresponding to the particular direction of rotation contemplated. With each machine, two feed-screws would be provided of opposite character, the same being bored and threaded respectively to correspond with each of the necks 17 and 18.

The feed-screw 16 preferably tapers toward its outer extremity, which extremity lies in the lower portion of a receiver 19. The upper mouth of this receiver 19 receives a feed-cone 20, which cone is provided with an opening 21 on its outer side, preferably as shown.

Arrangement is made for supporting a hopper 22 adapted to contain grain, which is delivered to the receiver 19. To this end, four columns 23 are provided, stepped upon the base 1, as shown, and these columns support above, a frame 24, which receives the hopper thereupon, as indicated. Beneath the hopper 22, a shaker 25 is provided, the bottom of which inclines downwardly toward the outer extremity thereof, which outer extremity lies substantially above the receiver 19 aforesaid. At its rear extremity, this shaker is attached by a suitable flexible joint 26 to the frame 24. The bottom of the shaker 25 comprises perforated plates or screens 27 and 28, the latter of which is located below the former, and is more finely perforated. The bottom-plate 29, secured below the plate 28, is intended to receive the sand and gritty particles which are sifted from the grain as it passes over the shaker, and this sand finds exit through a laterally disposed spout 30. The perforations in the upper plate 27 are of relatively large diameter, the function of this plate being simply to separate straw and other foreign particles from the grain; the refuse material separated by this plate would pass to the end of the shaker and fall upon the floor, while the grain would pass through to the perforated plate 28, where the sand and other particles would be separated as the grain passed on toward an opening 31, through which it could pass into the feed-cone 20; at the sides, this opening would be provided with guards or wings 32, as illustrated. It should be understood that during the operation of the machine, the shaker 25 is continuously vibrated or shaken so as to bring about a progressive movement of the grain from the hopper down to the receiver.

Figure 2:
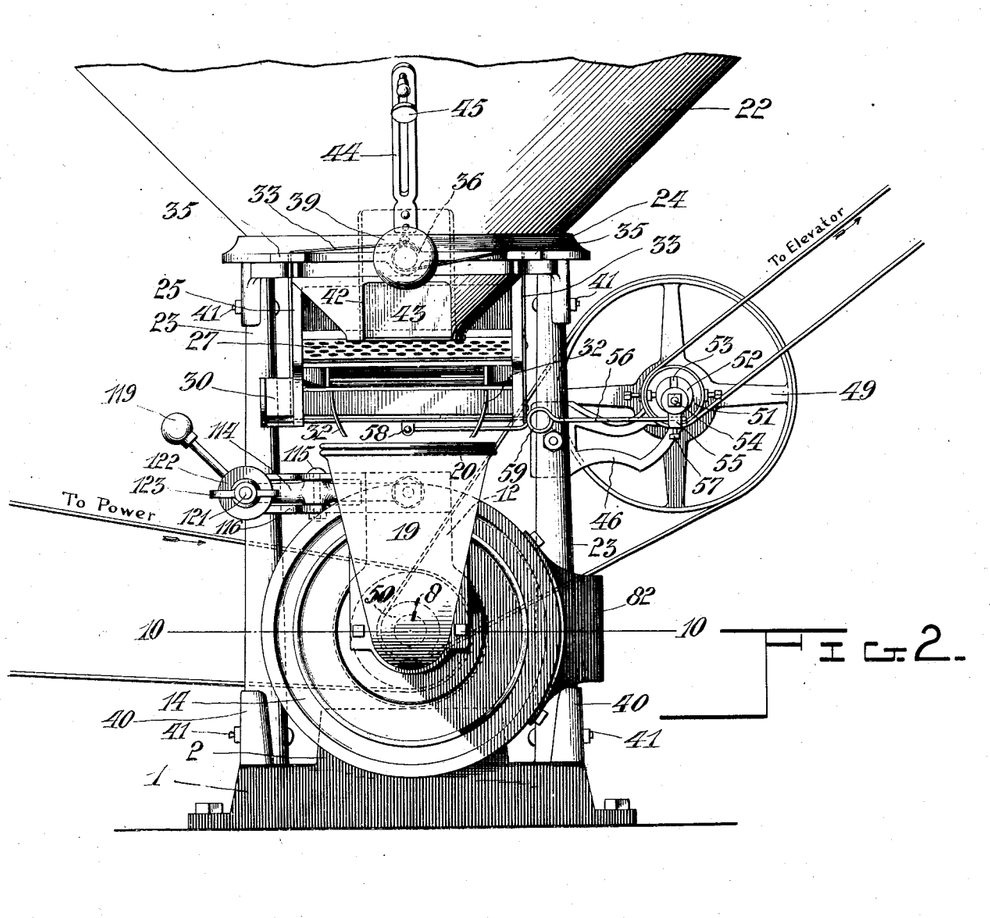
Fig. 2 is a front elevation of the machine shown in Fig. 1; in this view, the hopper is also broken away, as in Fig. 1.

Near its outer extremity, the shaker 25 is suspended upon straps or bands 33 of flexible material, which bands are attached to the sides of the shaker, as shown, and pass upwardly through openings 34 formed in a forward extension 35 of the frame 24. This forward extension 35 of the frame comprises a centrally disposed boss 36, in which a tapered plug 37 is rotatably mounted, arrangement being made for clamping the said plug in any desired position by means of a set-screw 38. The said plug 37 terminates forwardly in an enlarged head 39, constituting a hand-wheel for rotating the same. The straps or bands 33 pass respectively above and below the body of this plug 37, passing a short distance around the periphery thereof, as shown most clearly in Fig. 2. From this arrangement, by rotating the plug, the bands 33 would be simultaneously taken up or let out so as to effect a vertical adjustment of the shaker, as will be readily understood.

It is desirable that the shaking and continual vibration which is given to the shaker 25 should not be imparted to the other parts of the mill. For this reason, the columns 23 are preferably made of wood, which is of a nature adapted to absorb the vibration to a great extent. The manner of attaching the columns also assists in absorbing the vibration. These connections do not comprise sockets, but simply consist of curved wings 40 attached preferably by single pins 41.

For the purpose of regulating the exit of the grain from the hopper into the shaker, preferably the forward side of the hopper is provided with an opening 42, closed by a sliding shutter 43, which shutter is provided with a slotted upward extension 44 lying against the side of the hopper, and receiving a locking-screw 45, as shown.

The arrangement for actuating the shaker will now be described.

Figure 1:
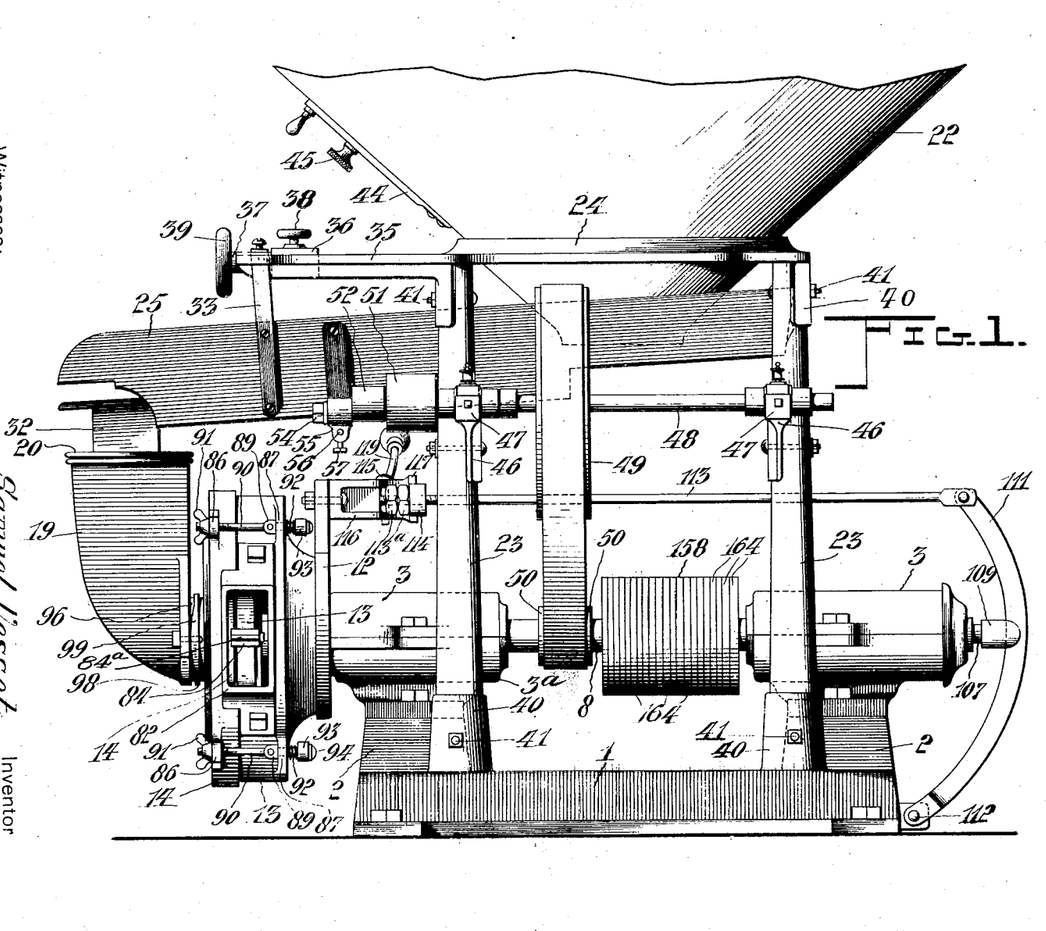
Figure 1 is a side elevation of a mill constructed according to my invention, a hopper disposed above the mill being represented as broken away, as will appear.
Figures 5, 8, 9:
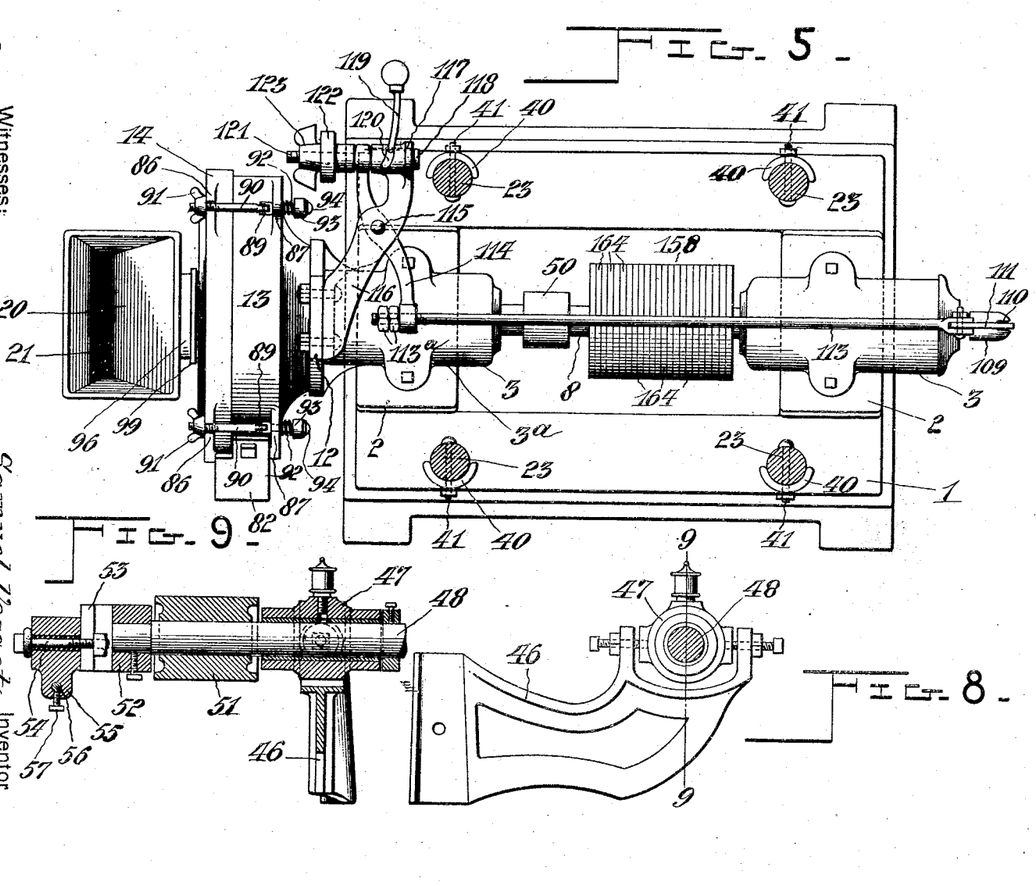
Fig. 5 is a section taken substantially on the line 5—5 of Fig. 3.
Fig. 8 is substantially a front elevation of a bracket, two of which are used in supporting a countershaft which operates the shaker.
Fig. 9 is a vertical central section through the countershaft, taken substantially on the line 9—9 of Fig. 8.

Brackets 46, which are attached to a pair of the columns 23 on the same side of the machine, are formed with bearings 47, which support between them a countershaft 48, as indicated most clearly in Fig. 1, the said countershaft being driven through the medium of pulleys 49 and 50, carried respectively by the said countershaft and the aforesaid main shaft 8. This countershaft 48 is provided with a belt pulley 51, for the purpose of driving an elevator, which is not shown. Referring now especially to Fig. 9, it should be stated that the extremity of the countershaft 48 carries rigidly a collar 52, which collar projects beyond the extremity of the shaft, as shown, so as to present a diametrically disposed slot 53, and this slot 53 receives the reduced extremity of a bolt 54; by means of this bolt 54, a head 55 is loosely attached, the same projecting downwardly, and being formed with a transverse opening receiving a shaker-rod 56, which is locked therein by means of a suitable setscrew 57. The shaker-rod 56 extends toward the shaker, and has its inner extremity attached thereto at the point 58. Preferably at substantially its central point, this shaker includes a coil 59, the object of which is to give the shaker a desirable elasticity or resiliency. From this arrangement, it should be understood that when the countershaft 48 is rotating continuously, the shaker will be vibrated from side to side, it being understood that the bolt 54 would normally be set out of axial alinement with the countershaft.

Evidently, the amplitude of the vibration could be adjusted by adjusting this bolt 54. The character of the support at the straps 33 much facilitates the shaking operation.

Figure 10:
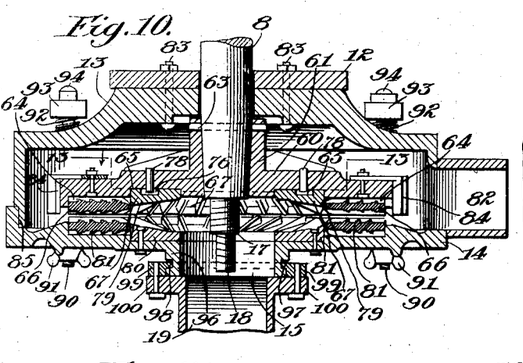
Fig. 10 is a horizontal central section taken through one of the grinders; this view is taken substantially on the line 10—10 of Fig. 2.
Figure 11:
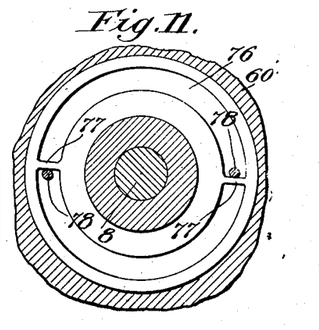
Fig. 11 is a section taken substantially on the line 13—13 of Fig. 10.
Figure 12:
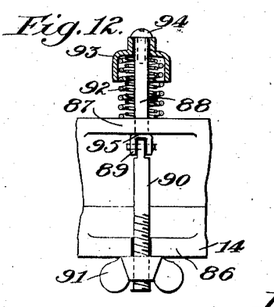
Fig. 12 is a side elevation showing a portion of the casing of the grinder, and illustrating the manner of attaching the cover of the casing.
Figure 13:
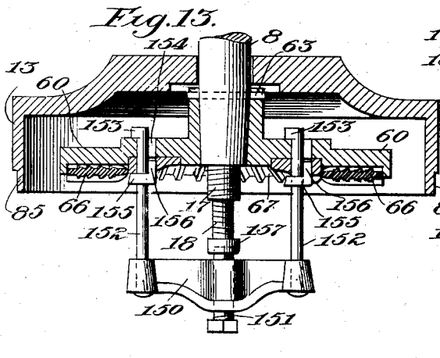
Fig. 13 is a central section through the grinder-casing, representing the cover of the casing as removed, and showing the construction and manner of application of certain apparatus for the purpose of removing a grinding-plate from the shaft.
Figure 14:
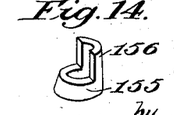
Fig. 14 is a perspective representing a collar.
Figure 15:
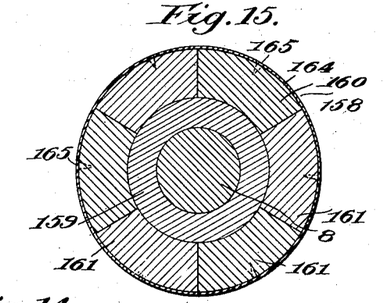
Fig. 15 is a cross section through a main pulley, which is carried by the main shaft, and through which the main shaft is driven.
Figure 16:
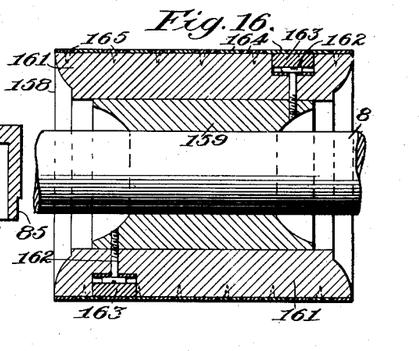
Fig. 16 is a longitudinal central section of the pulley shown in Fig. 14.

Referring especially to Fig. 10, it should be said that in this view, the feed-screw is represented as removed. The extremity of the shaft 8 which projects into the grinder-casing 13, is preferably tapered, as shown, in order to facilitate the attachment of the body 60 of a grinder-plate having a hub 61, with recesses 62, in the inner edge thereof, which recesses receive extremities of a pin 63, as shown; it should be understood that this grinder casing 13 would be tightly fitted upon the shaft, and it would be pressed into position. The outer face of the body 60 is formed with annular recesses 64 and 65, which are adapted respectively to receive a grinding-ring 66, and a center or nave 67.

The arrangement for driving the nave 67 through the medium of the wooden pin 78 is considered highly advantageous, for the reason that if a hard foreign object such as a stone should pass into the mill, it would simply result in breaking or shearing the driving extremities of the pins, without seriously damaging the face of the grinding-mill.

Upon the inner face of the cover 14 of the casing, a nave 80 is attached rigidly by means of bolts as shown, the said nave being in all respects similar to the nave 67, except as to the manner of attaching the same. At this point there is also attached a grinding-ring 81, which is substantially similar to the grinding-ring 66; this ring is rigidly attached to the cover, as will be readily understood.

Preferably at one side, the body 13 of the grinder-casing is provided with a spout 82, and in this connection it should be stated that the bolts 83, by means of which the said casing is attached to the plate 12, are preferably four in number, and symmetrically disposed and equidistant in such a manner as to enable the casing to be attached thereto with the spout in different positions. From this arrangement, where a customer wished the spout to deliver at the left side of the machine, the casing would be attached in a reversed position from that indicated in Fig. 10; in like manner, if it were desired to have the spout 82 disposed downwardly, the parts could be quickly adapted to this requirement in the same manner.

In order to facilitate the ejection of the ground material from the interior of the casing through the spout 82, the periphery of the plate-body 60 is provided with a pair of oppositely disposed angular plates 84, each provided with an outwardly extending rib 84ª, the same projecting beyond the periphery of the plate-body, as indicated most clearly in Fig. 10.

The cover 14, it should be understood, is not rigidly attached to the body 13 of the grinder-casing, the said cover being loosely applied to a reduced neck 85 formed about the periphery of the body as shown; mutilated ears 86 are provided upon the cover, which are disposed opposite to ears 87 on the casing, and through the ears 87 stems 88 are slidably mounted, the same making a knuckle-joint with bolts 90, as indicated; the threaded extremities of these bolts 90 receive wing-nuts 91, which clamp upon the ears 86; about the stems 88, helical springs 92 are disposed, the same thrusting at their extremities against caps 93, secured to the extremities of the stems by means of small screws 94, as shown. There are preferably two of the springs 92 in connection with each attachment, one of the same being of larger diameter so as to surround the other. In this manner, a considerable force is exerted at each fastening without necessitating the employment of inconveniently large springs. There are preferably four of these resilient connections disposed at an equal distance apart as indicated. It should be understood that the springs 92 normally maintain the cover at a fixed distance from the face of the rotatable grinding-wheel, and this relation is maintained during the grinding operation, except when a hard foreign substance gets into the mill through accident, whereupon the cover will move outwardly to accommodate itself to the emergency, preventing disastrous destruction of the faces of the grinding-wheels. In connection with the stems 88, it should be observed that at the joints 89 the stems are bifurcated, and form shoulders 95, which abut against the inner faces of the ears 87, and limit the movement of the stems due to the springs.

The outer face of the cover 14 is provided with a centrally disposed neck 96, the same being provided with a circumferential groove 97, which receives inwardly projecting flanges 98, carried by yokes 99, which yokes are attached to a hub 100, which hub is integral with the lower extremity of the aforesaid receiver 19. From this arrangement, the receiver 19 may be clamped in any desired position, and nicely adjusted in any position, as will be readily understood. The arrangement of the parts just described should appear very clearly from an inspection of Figs. 10.

Figure 3:
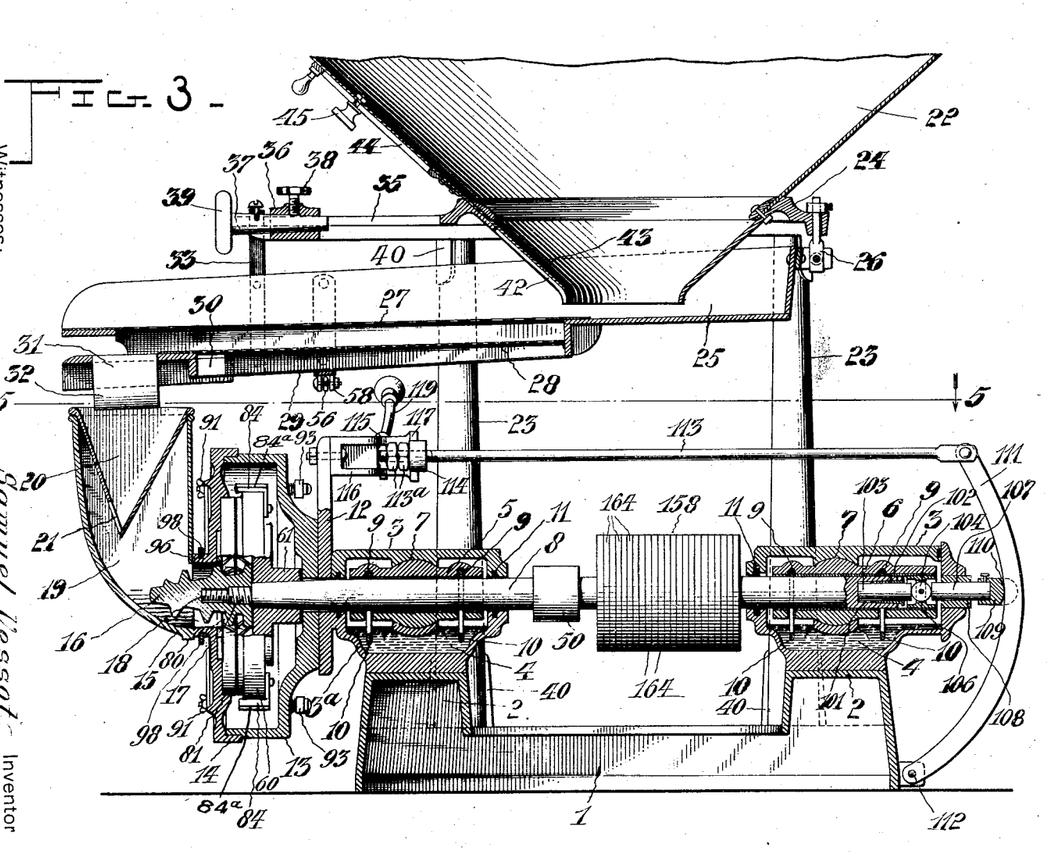
Fig. 3 is a longitudinal central section of the same machine, the upper portion of the hopper being broken away, as before.
Figures 4, 6, 7:
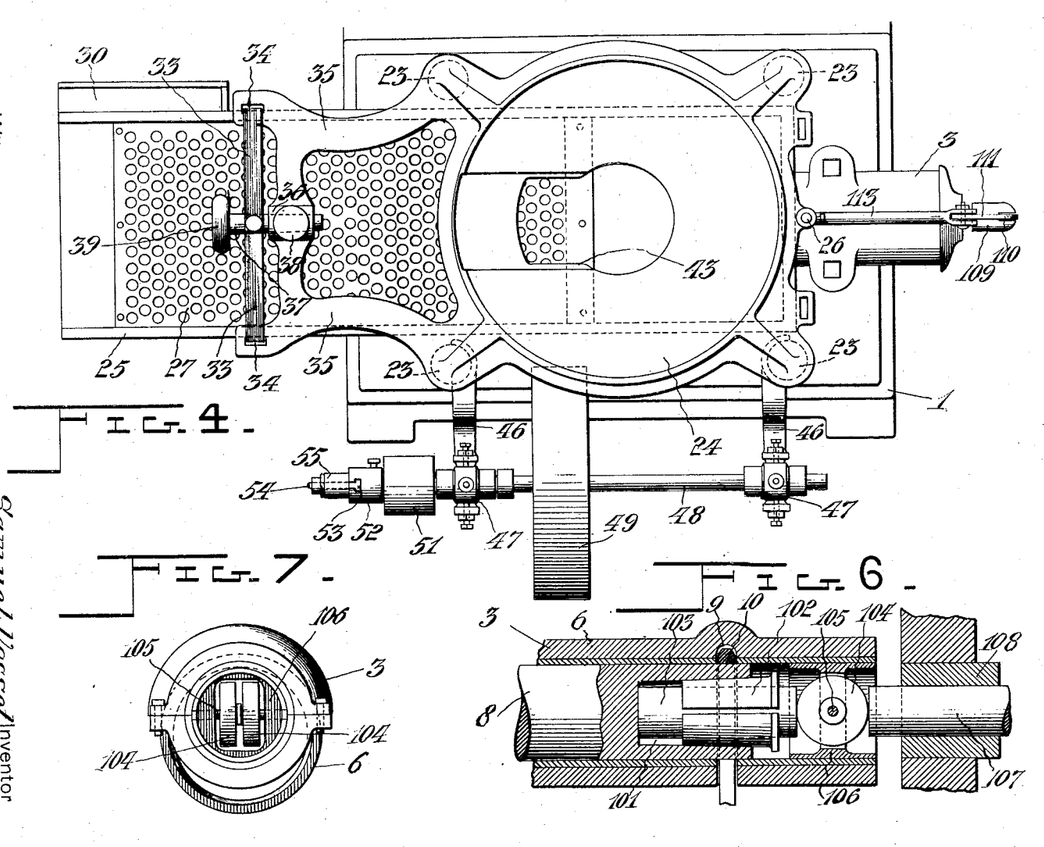
Fig. 4 is a plan, the hopper being represented as removed.
Fig. 6 is a central section which is an enlargement of certain parts shown in section at the right in Fig. 3. This section, as will be seen, is taken at one of the bearings, and illustrates means for taking the thrust of the shaft due to the grinding operation.
Fig. 7 is an end elevation of the extremity of the shaft at the point shown in Fig. 6, part of the mechanism for taking the thrust being shown.

Improved arrangement is made for taking the thrust of the shaft 8. In this connection, referring especially to Figs. 3 and 6, it will be seen that the inner extremity of the shaft 8 lies within the sleeve 6, at which point the said shaft is provided with a centrally disposed bore 101, which is slightly tapered as indicated; within this bore, there is mounted a split sleeve 102, which is adapted to clamp a thrust-pin 103, as shown, which pin projects outwardly beyond the sleeve, abutting at its extremity against a pair of rollers 104, which are rotatably mounted upon a transverse pin 105, carried by a thimble 106, which thimble is slidably mounted in the bore of the sleeve 6, as will be readily understood. On their outer sides, the faces of the rollers 104 are pressed by a second thrust-pin 107, which pin is slidably mounted in a bushing 108, set in the head of the box at this point, as shown. To the rear extremity of this pin 107, a cap 109 attaches, the same having a slot 110 at the back thereof, which slot receives a bow lever 111, the fulcrum whereof is had at 112 at the lower portion of the base 1. This lever 111 is adapted to take the thrust due to the pressure of the grain upon the face of the rotating grinding-wheel. From the arrangement described, it follows that this thrust will be taken very efficiently, and without the development of undue friction. For the purpose of effecting longitudinal adjustments of the shaft 8 in order to change when desired the degree of fineness of the ground product, an adjusting-rod 113 is attached to the upper extremity of the lever 111, and this rod extends longitudinally of the machine toward the forward extremity thereof, passing through the extremity of an adjusting lever 114, and receiving check-nuts 113ᵃ therebeyond; this lever 114 is pivoted at 115 to a bracket 116 attached to the inner face of the plate 12 at the upper portion thereof, as shown. At its extremity, this bracket 116 is provided with a head 117, having a bore, in which is rotatably mounted an adjusting-bolt 118, the said bolt having a laterally projecting handle 119, which passes through an inclined slot 120, formed through the wall of the head, as shown. The bolt 118 has a reduced stem 121, which is threaded and receives a thumb-nut 122 and a wing-nut 123, the latter operating as a check-nut for the former. The outer arm of the lever 114 is received around the stem 121, and may be pressed by the inner face of the thumb-nut 122, in such a manner as to lock the lever 114 against movement by a tensile force acting in the rod 113; from this arrangement, it follows that if the handle 119 were moved from one of its possible extreme positions to the other, the possible distance between the grinding faces in the grinder would be altered, and this mode of operation is useful and desirable for the purpose of enabling the mill to be adjusted for coarse or fine grinding in a simple manner. Evidently, the arrangement including the nuts 122 and 123, enables the character of the coarse and fine product to be changed.

The mode of operation of the preferred form will now be described.

It being understood that the grain from the hopper 22 would pass down along the shaker 25 toward the receiver 19, the said shaker could be adjusted vertically by means of the plug 37, which would simultaneously operate the suspending straps 33, the said plug being locked in any desired position by means of the set-screw 38. The grain received in the feed-cone 20, would pass downwardly through the opening 21, and come under the influence of the feed-screw 16, which would advance the same into the interior of the grinder-casing. At this point it should be stated that the purpose of the feed-cone 20 is to prevent any possibility of part of the grain being thrown up by the rotating feed-screw so as to throw the same out of the receiver. Passing between the grinding-plates, the grain would come under the influence of the naves or centers 67 and 80, which would operate to advance the same outwardly so as to force the grain into the space between the grinding-rings 66 and 81. In case a hard foreign substance such as a stone found its way into the space between the plates, the choking of the mill would only result in shearing the wooden pins 78, thus preventing the injury to the mill. Leaving the space between the grinding-rings, the ground grain would be ejected through the spout 82, this operation being assisted by the wings 84. The distance between the grinding-plates would be controlled by means of the adjusting-rod 113, through the medium of the bow lever 111, which would operate to adjust the shaft 8 longitudinally, carrying with it the rotating grinding-plate. The adjustment from coarse to fine grinding would be effected by throwing the handle 119 to the opposite extremity of the slot 120, formed in the head 117, as shown most clearly in Fig. 5. The thrust of the shaft 8 which would be taken up by the thrust-pins 103 and 107, would be borne by the said bow lever 111, in this manner enabling the mode of operation just described. When the thrust-pins 103 and 107 become worn from contact with the rollers 104, these pins could be reversed in position, their outer faces being placed inwardly; in this manner, the life of each pin would be doubled before necessitating a regrinding of its faces. The mode of operation of the other parts of the apparatus should be clear from the full description given originally in connection with them.

Having thus fully described my invention, what I claim as new and desire to secure by Letters Patent is:—

1. In a grain mill, in combination, grinding-plates, a frame, a bracket attached to said frame, a member rotatably mounted upon said bracket, said bracket and said member having the one an inclined slot and the other a handle lying therein, means for adjusting said grinding-plates, and mechanism connecting said last means with said member.

2. In a grain mill, in combination, a grinding-plate, a second grinding-plate slidably mounted to approach or recede from said first grinding-plate, an adjusting rod adapted to control said second grinding-plate, a rotatable member, a sleeve supporting the same, said member and said sleeve having the one an inclined slot and the other a projection lying in said slot whereby a relative rotation may move said adjusting rod.

3. In a grain mill, in combination, grinding-plates, a frame, a bracket attached to said frame and having a sleeve with an inclined slot therethrough, a bolt rotatably mounted in said sleeve and having a handle passing through said slot, a lever pivoted to said bracket and lying adjacent to said bolt to receive the longitudinal movement thereof, an adjusting rod connected with said lever, and mechanism connecting said adjusting rod with one of said grinding-plates.

4. In a grain mill, the combination, a shaker, a shaft adapted to be continuously driven, a collar attached to said shaft and having a transverse slot, a bolt, means for attaching the same in said slot, a member rotatably mounted upon said bolt, and a resilient rod attached to said member and said shaker and adapted to vibrate said shaker laterally.

5. In a grain mill, in combination, a grinding-wheel, a shaft carrying the same, a sleeve surrounding said shaft and projecting beyond the extremity thereof, said shaft having a bore in the extremity thereof, a split sleeve carried in said bore, a thrust-pin received within said sleeve, a thimble carried within said first sleeve, a pair of rollers carried by said thimble the faces whereof abut against the extremity of said thrust-pin, a second thrust-pin abutting said rollers on the opposite side, means for guiding said thrust-pin longitudinally, an adjusting-lever controlling the position of said second thrust-pin, and means for adjusting said lever.

6. In a grain mill, in combination, a grinder-casing, a shaft, a grinding-wheel carried by said shaft within said casing, said shaft having a threaded extremity and a reduced threaded neck therebeyond, the threads of said neck and said extremity being of opposite character, and a pair of conveyer-screws adapted to attach to said shaft and each having bores and counterbores, the bore of one of said screws having threads corresponding to the threads of said extremity, and the counterbore of the other of said screws having threads corresponding to said neck.

7. In a grain mill, a rotatable grinding-wheel, a casing inclosing the same and having a spout, and ejectors attached to the periphery of said wheel and projecting radially therefrom, each comprising an angular plate having a rib projecting from one side thereof.

8. In a grain mill, in combination, a shaft having a tapered extremity, a grinding-wheel having a hub with a tapered bore mounted upon the extremity of said shaft, said shaft having a transverse pin, said hub having diametrically opposite recesses in the edge thereof adapted to receive said pin.

In witness whereof I have hereunto set my hand in the presence of two witnesses.

SAMUEL VESSOT.

Witnesses:
T. MYNARD,
M. MCALEET.